United States Patent [19]

Tachibana et al.

[11] Patent Number: 4,731,675
[45] Date of Patent: Mar. 15, 1988

[54] DROPOUT CORRECTING APPARATUS WHEREIN DROPOUT DETECTING FLOG SIGNAL IS SUPERIMPOSED ON REPRODUCED VIDEO SIGNAL

[75] Inventors: Kaoru Tachibana, Kanagawa; Ken Morita, Tokyo, both of Japan

[73] Assignee: Sony Corporation, Tokyo, Japan

[21] Appl. No.: 774,468

[22] Filed: Sep. 10, 1985

[30] Foreign Application Priority Data

Sep. 13, 1984 [JP] Japan .................................. 59-190634

[51] Int. Cl.⁴ .............................................. H04N 5/76
[52] U.S. Cl. ..................................... 358/336; 360/38.1
[58] Field of Search ............... 358/320, 314, 336, 337; 360/38.1

[56] References Cited

U.S. PATENT DOCUMENTS 4,293,869  10/1981  Scholz ................................ 358/314

*Primary Examiner*—Robert L. Richardson
*Attorney, Agent, or Firm*—Lewis H. Eslinger; Alvin Sinderbrand

[57] ABSTRACT

A dropout correcting apparatus has a dropout detecting circuit for detecting a dropout from a reproduced video signal. A mixing circuit superimposes a dropout detecting flag signal from the dropout detecting circuit upon the reproduced video signal. A time base fluctuation correcting circuit removes a jitter component of an output signal from the mixing circuit. A dropout detecting signal separating circuit separates the dropout detecting flag signal from the output signal of the time base fluctuation correcting circuit, and a dropout correcting circuit corrects the dropout of the reproduced video signal in response to the separated dropout detecting flag signal.

4 Claims, 6 Drawing Figures

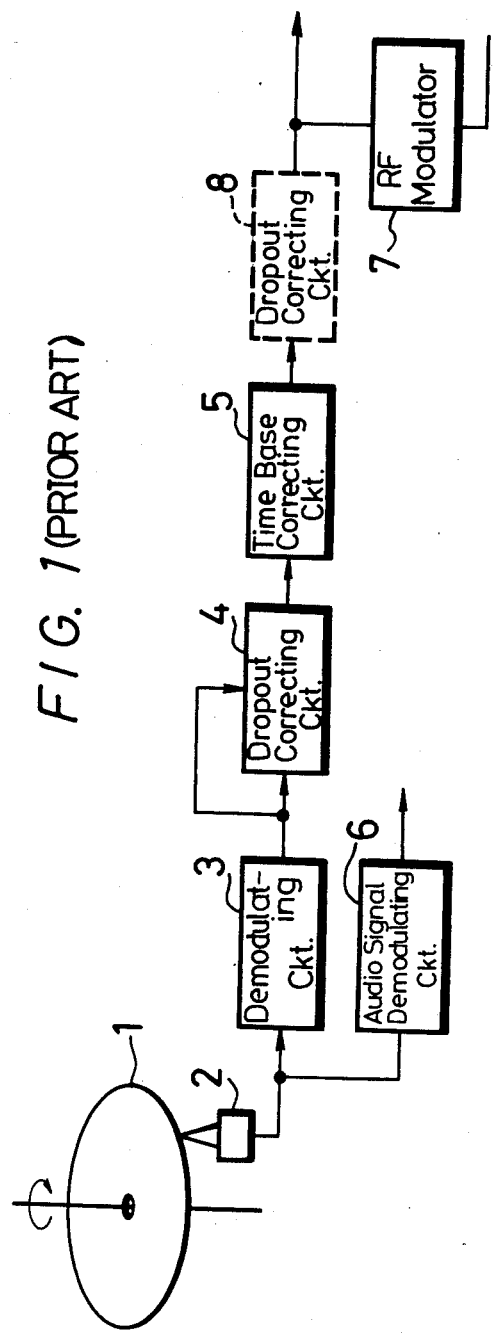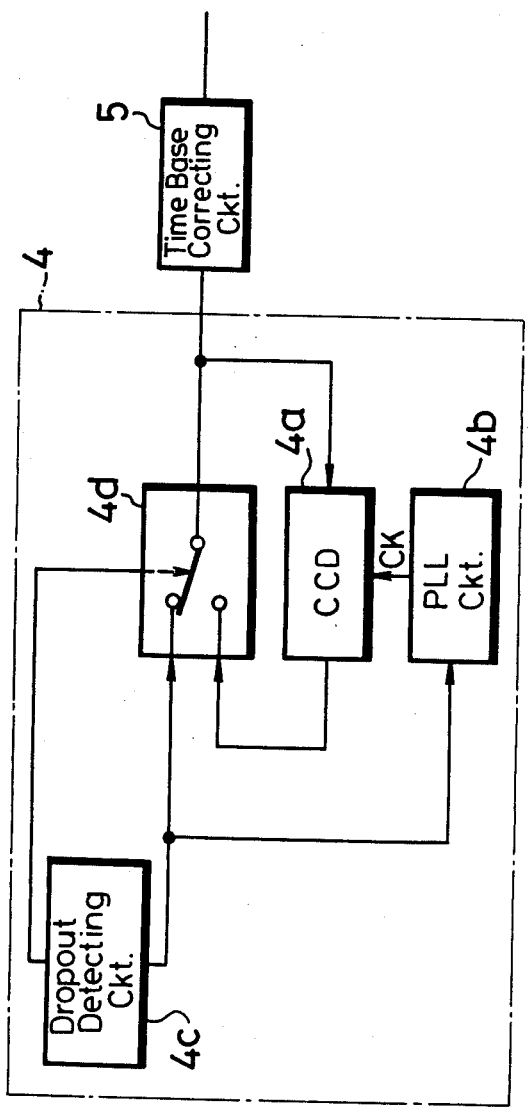

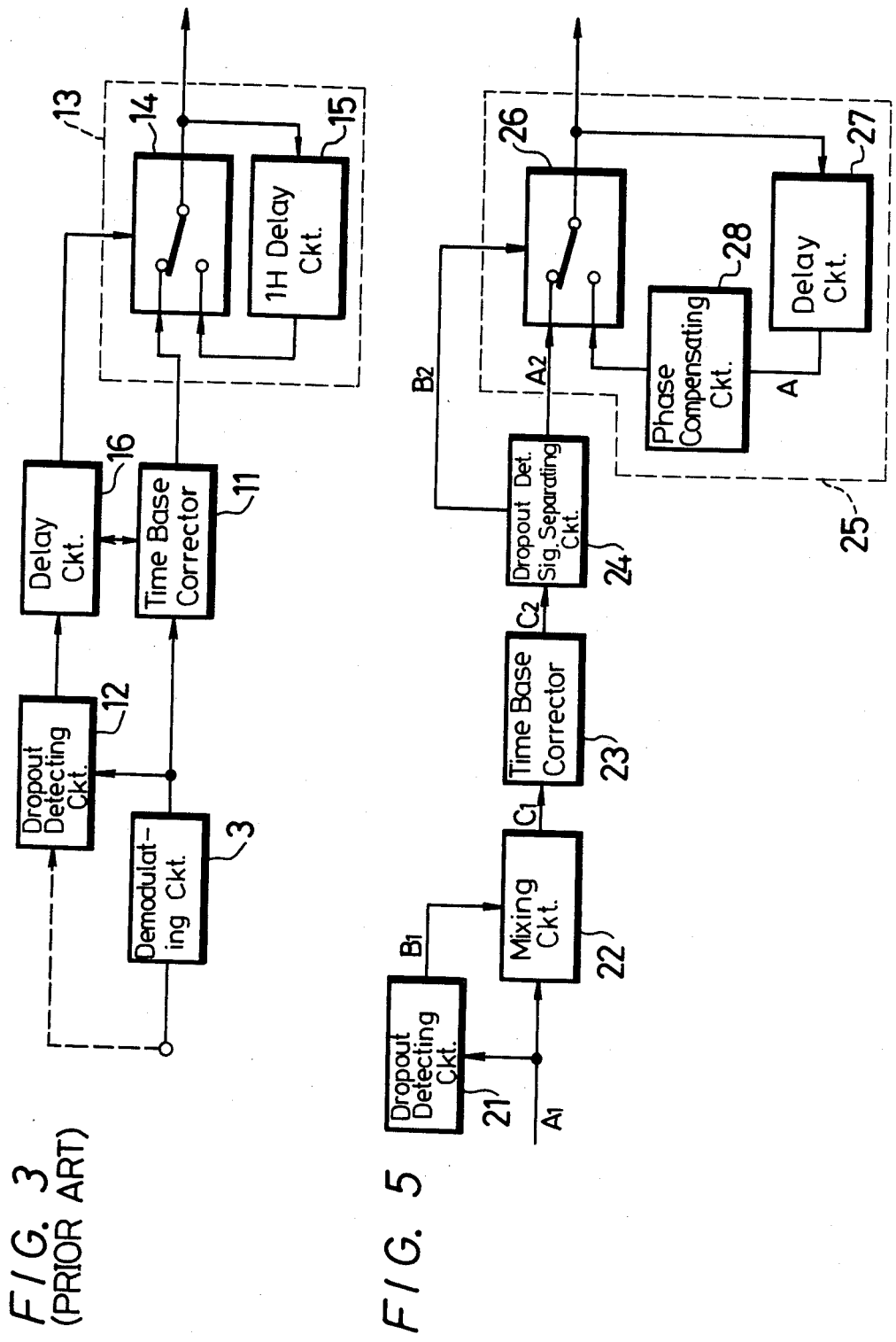

DROPOUT CORRECTING APPARATUS WHEREIN DROPOUT DETECTING FLOG SIGNAL IS SUPERIMPOSED ON REPRODUCED VIDEO SIGNAL

BACKGROUND OF THE INVENTION

1. Field of the Invention

The present invention generally relates to a dropout correcting apparatus for correcting a dropout of a reproduced video signal and, more particularly, is directed to a dropout correcting apparatus suitable for correcting a dropout of a video signal which is reproduced from a video disc.

2. Description of the Prior Art

FIG. 1 is a circuit block diagram showing an example of a prior art reproducing circuit for a video disc. Referring to FIG. 1, reference numeral 1 designates a video disc which is rotated, reference numeral 2 designates an optical pickup device which picks up a signal recorded on the video disc 1, reference numeral 3 designates a demodulating circuit which demodulates the reproduced video signal, reference numeral 4 designates a dropout correcting circuit which corrects a dropout of the reproduced video signal and reference numeral 5 designates a time base fluctuation correcting circuit which removes a jitter component of the video signal.

Further, reference numeral 6 designates an audio signal demodulating circuit connected to the optical pickup device 2 and 7 an RF modulator connected to the time base fluctuation correcting circuit 5.

Since the video signal recorded on the video disc 1 is generally reproduced in the form of a standard composite video signal (of, for example, NTSC system), it is corrected for dropout by the dropout correcting circuit 4 and then fed to the time base fluctuation correcting ciruit 5, in which its jitter component is removed and delivered as a normal and correct video signal. Further, an audio signal is demodulated by the audio demodulating circuit 6.

In such prior art video signal reproducing circuit, as shown in FIG. 1, the dropout of the video signal is corrected by the dropout correcting circuit 4 under the condition that the video signal contains the jitter component or the dropout of the video signal is corrected by a dropout correcting circuit 8 which is connected at the output stage of the time base fluctuation correcting circuit 5 as shown by a broken line in FIG. 1.

FIG. 2 is a block diagram showing a main part of the dropout correcting circuit 4 which carries out the dropout correction prior to the time base fluctuation correcting circuit (hereinafter simply referred to as TBC) 5. In FIG. 2, reference numeral 4a designates a delay element which corrects the time base fluctuation of a video signal one horizontal scanning period (1H) before. This delay element 4a is formed of a CCD (charge coupled device) the delay time of which can be varied by a clock signal CK supplied thereto. Reference numeral 4b designates a PLL (phase locked loop) circuit for producing the clock signal CK which drives the delay element 4a. Reference numeral 4c designates a dropout detecting circuit which produces a dropout flag when it detects a dropout. Reference numeral 4d designates a switching circuit which is changed in position by the dropout flag supplied thereto from the dropout detecting circuit 4c thereby to produce the video signal 1H before only during the dropout period.

In this dropout correcting circuit 4, if the normal video signal having no dropout is supplied thereto, such video signal is supplied as it is through the switching circuit 4d to the TBC 5, while such video signal passed through the switching circuit 4d is supplied to the delay element 4a, in which it is delayed by the time 1H.

Accordingly, if a video signal having a dropout is reproduced next time, the movable contact arm of the switching circuit 4d is connected to the opposite side by the dropout flag derived from the dropout detecting circuit 4c so that the video signal having the dropout is replaced by the video signal 1H before only during the dropout period and the dropout portion thereof is corrected, which is fed to the TBC 5.

FIG. 3 is a circuit block diagram showing a main part of a prior art dropout correcting circuit as disclosed in a published document of Japanese patent application unexamined NO. 120383/1983, in which the dropout correction is carried out after the TBC. Referring to FIG. 3, reference numeral 11 designates a TBC which carries out the time base correction of the video signal, 12 a dropout detecting circuit, 13 a dropout correcting circuit formed of a switching circuit 14 and a 1H delay circuit 15, and 16 a variable type delay circuit which carries out the time base fluctuation correction for the dropout flag in synchronism with the TBC 11 to thereby synchronize the dropout flag with the video signal and which is formed of a CCD or a second time base fluctuation correcting circuit (TBC), etc.

In this dropout correcting circuit, the normal video signal having no dropout is corrected for time base fluctuation by the TBC 11 and then fed via the switching circuit 14 as it is.

If on the other hand the video signal contains the dropout, the dropout is detected by the dropout detecting circuit 12 and the dropout flag therefrom is supplied to the switching circuit 14 through the delay circuit 16 whose delay time is controlled in synchronism with the TBC 11. As a result, the input to the switching circuit 14 is selectively changed by this dropout flag, so that during the dropout period, the normal video signal 1H before derived from the 1H delay circuit 15 is delivered as a corrected signal, thus the dropout being interpolated.

In the prior art dropout correcting apparatus as mentioned hereinabove, when the dropout correction is carried out before the time base fluctuation is corrected, as shown in FIG. 2, it is necessary to provide the variable delay element 4a for delaying the normal video signal which is used in replace of the signal to be corrected in the switching circuit 4d and the PLL circuit 4b which drives this delay circuit 4a in order that the normal video signal and the signal to be corrected are synchronized with each other.

On the other hand, when the dropout correction is carried out after the time base fluctuation is corrected, as shown in FIG. 3, the dropout detecting signal must be corrected for time base fluctuation so as to be synchronized with the signal to be corrected and then fed to the switching circuit 14. Therefore, there is a defect that an extra system of the delay circuit 16 will have to be provided.

For this reason, the prior art dropout correcting apparatus needs many circuit elements and is high in a manufacturing cost and is poor in circuit maintenance.

OBJECTS AND SUMMARY OF THE INVENTION

Accordingly, it is an object of this intention to provide a dropout correcting apparatus which simplifies its circuit arrangement by removing a variable type delay element and which can correct a dropout contained in a video signal.

It is another object of this invention to provide a dropout correcting apparatus suitable for correcting a dropout of a video signal reproduced from a video disc.

According to one aspect of the present invention, there is provided a dropout correcting apparatus comprising:

(a) a dropout detecting circuit for detecting a dropout period from a reproduced RF signal or a reproduced video signal;

(b) a mixing circuit for superimposing a dropout detecting signal from said dropout detecting circuit upon said reproduced video signal;

(c) a time base fluctuation correcting circuit for removing a jitter component of a mixed signal from said mixing circuit;

(d) a dropout detecting signal separating circuit for separating said dropout detecting signal from an output signal derived from said time base fluctuation correcting circuit; and (e) a dropout correcting circuit which corrects a dropout of said output signal by said separated dropout detected signal.

The above and other objects, features and advantages of the present invention will become apparent from the following detailed description of illustrative embodiments thereof to be read in conjunction with the accompanying drawings, throughout which like references designate the same elements and parts.

BRIEF DESCRIPTION OF THE DRAWINGS

FIG. 1 is a circuit block diagram of a prior art reproducing apparatus for reproducing a video signal from a video disc;

FIG. 2 is a circuit block diagram showing a prior art dropout correcting apparatus for correcting a dropout in the stage prior to a time base corrector;

FIG. 3 is a circuit block diagram showing a prior art dropout correcting apparatus for correcting a dropout in the stage following the time base corrector;

FIG. 5 is a circuit block diagram showing a main part of another embodiment of the dropout correcting apparatus according to this invention.

DESCRIPTION OF THE PREFERRED EMBODIMENTS

Now, the present invention will hereinafter be described with reference to the drawings.

Figure 4A:
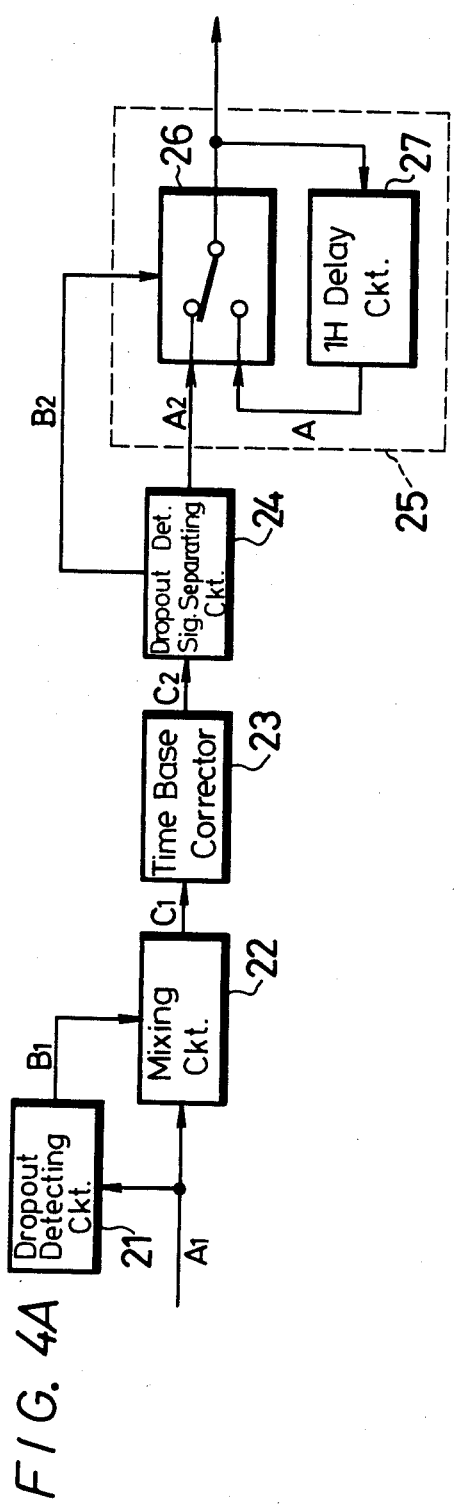
FIG. 4A is a circuit block diagram showing a main part of an embodiment of a dropout correcting apparatus according to this invention.
Figure 4B:
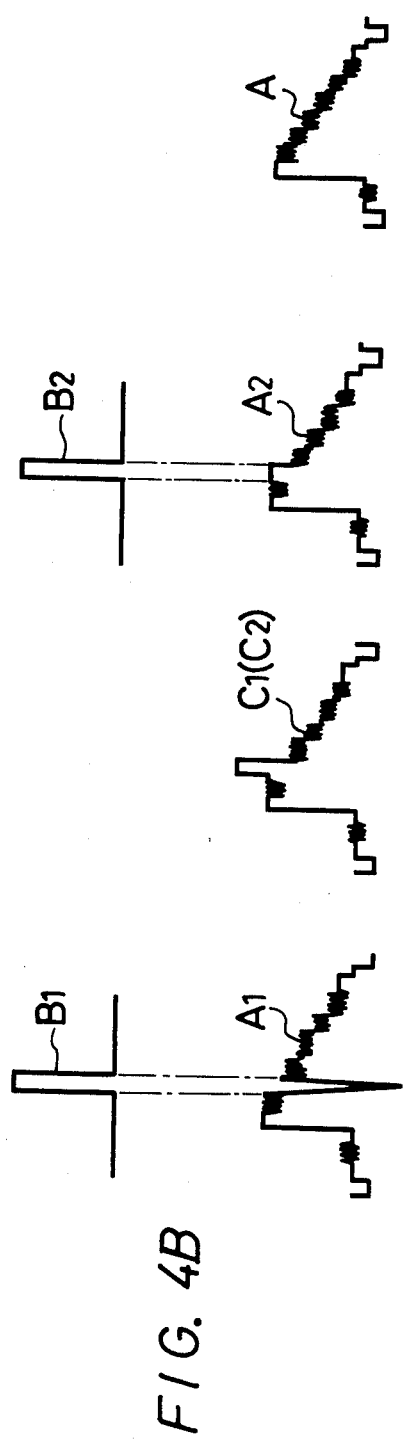
FIG. 4B is waveform diagrams at main parts of the dropout correcting apparatus of FIG. 4A, useful for explaining the operation thereof.

FIG. 4A is a circuit block diagram showing a main part of a dropout correcting apparatus according to the first embodiment of this invention and FIG. 4B is waveform diagrams at main parts of the dropout correcting apparatus shown in FIG. 4A. In FIG. 4A, reference numeral 21 designates a dropout detecting circuit which produces a dropout detecting signal (or dropout flag) when a video signal contains a dropout, reference numeral 22 designates a mixing circuit which superimposes the dropout detecting signal from the dropout detecting circuit 21 upon the video signal, reference numeral 23 designates a TBC which removes a jitter component of the video signal, reference numeral 24 designates a dropout detecting signal separating circuit which separates the dropout detecting signal from the video signal the jitter component of which is removed by the TBC 23 when the video signal contains the dropout detecting signal, and reference numeral 25 designates a dropout correcting circuit that is formed of a switching circuit 26 and a 1H delay circuit 27 of a fixed type.

Since the dropout correcting apparatus of this invention is constructed as described above, when a reproduced video signal, whose waveform is $A_1$ as shown in FIG. 4B and which contains a dropout, is supplied thereto, a signal or dropout flag whose waveform is $B_1$ and which has a pulse width corresponding to the dropout as shown in FIG. 4B, is formed by the dropout detecting circuit 21. The signal with the waveform $B_1$ is supplied to the mixing circuit 22, in which it is superimposed upon the video signal with the waveform $A_1$ to form a mixed signal whose waveform is $C_1$ shown in FIG. 4B. The mixed signal with the waveform $C_1$ is supplied to the TBC 23, in which the jitter component thereof is removed, and then made as a mixed signal, whose waveform is $C_2$ shown in FIG. 4B and which has a duration of time of exactly 1H.

Then, the mixed signal of the waveform $C_2$ is supplied to the dropout detecting signal separating circuit 24 in which the signal portion thereof indicative of the dropout flag is extracted by, for example, a slice circuit and then separated as the signal with a waveform $B_2$. The signal with the waveform $B_2$ is fed to the switching circuit 26. Since the switching circuit 26 is controlled to be changed in position by the dropout flag or the dropout detecting signal with the waveform $B_2$, in the signal portion of the dropout, the normal video signal (shown by the waveform A in FIG. 4B) 1H before and produced from the 1H delay circuit 27 is selected by the switching circuit 26 and the dropout portion is interpolated by the video signal 1H before. Accordingly, the switching circuit 26 produces the video signal the jitter component of which is removed and in which the dropout portion is interpolated or corrected.

In the case of this embodiment, since the waveform $B_1$ of the dropout flag is formed so a to become higher than the white level of the video signal, after the jitter component is removed from the video signal by the TBC 23, the dropout flag can be simply extracted and then separated by the slice circuit of the dropout signal separating circuit 24.

As the dropout flag, it is possible to use, for example, a burst signal whose frequency is higher than the frequency band of the video signal. In this case, the dropout detecting signal separating circuit 24 may be formed of a band-pass filter which extracts this burst signal.

Since the dropout portion contains discontinuous signal components and has a high frequency (higher than 4.2 MHz), it may be possible that the dropout detecting circuit 21 detects the dropout by a high-pass filter and forms the dropout flag by waveform-reshaping the detecting signal Further, it may be possible to detect the dropout in the stage of an FM signal before it is demodulated to the video signal.

In this case, there is provided a monostable multivibrator that is triggered by the FM signal. If the pulse width of an output from the monostable multivibrator is set at a predetermined value, this monostable multivibrator no longer produces the output at the dropout portion so that the dropout flag can be formed simply.

In case of correcting the dropout in a video signal reproduced from a magnetic tape, the dropout correcting apparatus of this invention can also be employed.

While by the above or first embodiment of the present invention a dropout of the luminance signal in the video signal can be corrected, if a dropout of the chrominance signal in the video signal is corrected, the phase of the chrominance signal is displaced so that it is not possible to correct the dropout of the chrominance signal as it is. In this case, however, if a circuit for compensating for the phase of the chrominance signal is provided in the dropout correcting circuit 25 of the first embodiment of the present invention, it is possible to correct not only the dropout of the luminance signal but also the dropout of the chrominance signal.

FIG. 5 is a circuit block diagram showing a second embodiment of such dropout correcting apparatus according to this invention as mentioned just hereinabove. In FIG. 5, like parts corresponding to those of FIG. 4A are marked with the same references and will not be described in detail.

Referring to FIG. 5, reference numeral 28 designates a phase compensating circuit for compensating for the phase displacement of the chrominance signal which is caused when the dropout portion is interpolated by the video signal 1H before derived from the delay circuit 27.

This phase compensating circuit 28 may be formed so that in the case of, for example, NTSC system, the luminance signal is extracted from the video signal, which is delayed 1H by the delay circuit 27, by a low-pass filter and this luminance signal is added with the chrominance signal which is extracted from the afore-mentioned video signal by the band-pass filter and inverted. Further, the phase compensating circuit 28 can also be formed by a circuit arrangement such as a transversal filter in which the delay time of the delay circuit 27 is taken as $1H + \tau/2 (\tau = 1/f_{SC}: f_{SC}$ is the carrier frequency of the chrominance signal) and a terminal is led out from a portion of $1H - \tau/2$ of the above delay circuit 27. With this circuit arrangement, it is possible to compensate for the phase of the chrominance signal.

As set forth above, according to the dropout correcting apparatus of the present invention, since the dropout detecting signal is superimposed upon the dropout portion of the video signal containing the dropout thereby to provide the mixed signal, fed to the TBC in which the jitter component of the video signal is removed and the dropout correcting circuit is operated by the dropout detecting signal which is separated again, it is possible to correct the dropout of the video signal containing the jitter component simply.

When a dropout noise whose level is lower than the synchronizing signal occurs in the video signal due to the dropout, a trouble occurs frequently in the synchronization separation in the TBC and the synchronization separation of the servo circuit. However, in accordance with the present invention, since the dropout detecting signal is superimposed upon the dropout portion, there is an advantage that no trouble occurs in the synchronization separation.

The above description is given on the preferred embodiments of the invention but it will be apparent that many moidifications and variations could be effected by one skilled in the art without departing from the spirits or scope of the novel concepts of the invention, so that the scope of the invention should be determined by the appended claims only.

We claim as our invention:

1. A dropout correcting apparatus comprising:
   a dropout detecting circuit for detecting a dropout from a reproduced RF signal or a reproduced video signal and generating a dropout detecting flag signal in response thereto;
   a mixing circuit for superimposing said dropout detecting flag signal upon said reproduced video signal to produce a mixed signal;
   a time base fluctuation correcting circuit for removing a jitter component of said mixed signal to produce a time base corrected output signal;
   a dropout detecting flag signal separating circuit for separating said dropout detecting flag signal from said time base corrected output signal; and
   a dropout correcting circuit which corrects a dropout of said time base corrected output signal in response to said separated dropout detecting flag signal.

2. A dropout correcting apparatus as claimed in claim 1, wherein said video signal has a white level and said dropout detecting flag signal has a level higher than said white level.

3. A dropout correcting apparatus as claimed in claim 2, wherein said dropout correcting circuit comprises a switching circuit changed in position in response to said separated dropout detecting flag signal and a delay circuit for interpolating a dropout portion in response to a video signal one horizontal scanning period before and producing an interpolation output signal.

4. A dropout correcting apparatus according to claim 3 further comprising a phase compensating circuit for compensating for a phase of said interpolation output signal.

* * * * *